(12) United States Patent
Arnalsteen

(10) Patent No.: US 8,267,113 B2
(45) Date of Patent: Sep. 18, 2012

(54) SAFETY VALVE FOR THE VENTING CIRCUIT OF A LIQUID TANK

(75) Inventor: Michel Arnalsteen, Groot-Bijgaarden (BE)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 571 days.

(21) Appl. No.: 11/915,363

(22) PCT Filed: May 18, 2006

(86) PCT No.: PCT/EP2006/062423
§ 371 (c)(1),
(2), (4) Date: Nov. 23, 2007

(87) PCT Pub. No.: WO2006/125752
PCT Pub. Date: Nov. 30, 2006

(65) Prior Publication Data
US 2008/0190490 A1    Aug. 14, 2008

(30) Foreign Application Priority Data
May 24, 2005   (FR) ...................................... 05 05196

(51) Int. Cl.
*F16K 24/04*    (2006.01)
(52) U.S. Cl. ......................................... 137/202; 137/43
(58) Field of Classification Search .................... 137/43, 137/202, 39, 587
See application file for complete search history.

(56) References Cited

U.S. PATENT DOCUMENTS

| | | | |
|---|---|---|---|
| 2,849,016 A * | 8/1958 | Nations .......................... | 137/202 |
| 2,860,656 A | 11/1958 | Eshbaugh et al. | |
| 4,694,847 A | 9/1987 | Szlaga | |
| 5,004,002 A | 4/1991 | Kobayashi | |
| 5,028,244 A | 7/1991 | Szlaga | |
| 5,215,110 A * | 6/1993 | Benjey ............................ | 137/43 |
| 5,234,013 A * | 8/1993 | Roetker et al. .................. | 137/43 |
| 5,535,772 A * | 7/1996 | Roetker et al. .................. | 137/43 |
| 5,566,705 A * | 10/1996 | Harris ............................. | 137/43 |
| 5,579,802 A * | 12/1996 | Tuckey ............................ | 137/202 |
| 5,582,198 A | 12/1996 | Nagino et al. | |
| 5,590,697 A | 1/1997 | Benjey et al. | |
| 5,755,248 A * | 5/1998 | Szlaga et al. .................... | 137/43 |
| 5,809,976 A * | 9/1998 | Cook et al. ..................... | 137/202 |
| 5,836,341 A * | 11/1998 | Ayers et al. .................... | 137/202 |

(Continued)

OTHER PUBLICATIONS

U.S. Appl. No. 11/920,844, filed Nov. 21, 2007, Rouxel et al.

*Primary Examiner* — Craig Schneider
*Assistant Examiner* — Craig J Price
(74) *Attorney, Agent, or Firm* — Oblon, Spivak, McClelland, Maier & Neustadt, L.L.P.

(57) ABSTRACT

Safety valve for the venting circuit of a liquid tank Safety valve for the venting circuit of a liquid tank, comprising: a) a chamber (1) provided with a cover (2), which extends at least partly into the tank and is connected via an aperture (4) to the venting circuit; b) a float (7), which can slide vertically inside the chamber (1) and close off the venting aperture (4) in a high position; and c) a moveable wall (3), which divides the chamber (1) into a lower portion (1') in which the float (7) slides and an upper portion (1") which connects with the venting circuit, this wall (3) being a moveable wall and having the venting aperture (4), said valve further including an aperture stop (13) integral either with the moveable wall (3) or with the cover (2).

12 Claims, 1 Drawing Sheet

U.S. PATENT DOCUMENTS

| | | | |
|---|---|---|---|
| 6,058,970 A * | 5/2000 | Osaki et al. | 137/202 |
| 6,105,608 A * | 8/2000 | Katzman | 137/202 |
| 6,145,532 A * | 11/2000 | Tuckey et al. | 137/202 |
| 6,158,456 A * | 12/2000 | Enge | 137/202 |
| 6,343,590 B1 * | 2/2002 | Nagai et al. | 137/202 |
| 6,386,222 B1 * | 5/2002 | Harris | 137/43 |
| 6,439,206 B1 * | 8/2002 | Shimamura et al. | 137/202 |
| 6,719,000 B1 | 4/2004 | Forsythe et al. | |
| 7,207,347 B2 * | 4/2007 | Olshanetsky et al. | 137/202 |
| 2002/0074037 A1 | 6/2002 | Enge | |
| 2003/0066558 A1 * | 4/2003 | Muto et al. | 137/202 |
| 2004/0045602 A1 | 3/2004 | Palvolgyi et al. | |
| 2006/0266415 A1 | 11/2006 | Ganachaud et al. | |

* cited by examiner

SAFETY VALVE FOR THE VENTING CIRCUIT OF A LIQUID TANK

BACKGROUND OF THE INVETNION

1. Field of the Invention

The present invention relates to a safety valve for the venting circuit of a liquid tank, in particular a fuel tank with which a motor vehicle may be equipped.

Liquid tanks, in particular fuel tanks for motor vehicles, are nowadays generally provided inter alia with a venting circuit. This circuit allows air to be introduced into the tank in the event of underpressure (especially for compensating for the volume of liquid consumed) or allows the gases contained in the tank to be removed in the event of overpressure (especially in the event of overheating). This circuit also allows the ducting and possible filtering of the gases that have to be discharged into the atmosphere, for the purpose of meeting the ever stricter environmental requirements in this regard.

2. Description of the Prior Art

The venting circuit generally includes a safety valve of the ROV (roll-over valve) type which as far as possible prevents liquid from coming out of the tank in the event of said tank rolling over or being at an excessively high angle of inclination. This safety valve must also respond rapidly and reliably when its intervention conditions occur, but with minimum sensitivity to abnormal phenomena such as especially a very high flow rate, overpressure in the tank or low-amplitude waves.

The venting circuit may also include a safety valve of the FLVV (fill limit venting valve) which sets the maximum fill level of the tank and limits overfilling.

Some safety valves provide both the ROV function and the FLVV function.

Many safety valves employ a float, comprising an upper needle that closes off an aperture for connection between the tank and the venting circuit. The disadvantage of such valves is that when the aperture is closed off for a long time (for example when the tank remains for a long period at its maximum fill level), the pressure rises inside the tank and can no longer be relieved by said aperture, hence the occurrence of an overpressure that has to be relieved by an additional device.

To alleviate this drawback, valves with a moveable valve seat have been developed. Thus, for example, patent U.S. Pat. No. 5,004,002 discloses a valve with a needle float and a moveable valve seat. This valve seat may be a diaphragm pierced by an aperture (see FIG. 5), which rises above a certain pressure so as to separate the needle of the float from said aperture. The valve described in that patent was developed for fuel systems that have to withstand a relatively high pressure level. Consequently, to prevent the needle sticking in the aperture, the movement of the float is blocked by means of a stop so that only the diaphragm can move above a certain pressure. The drawback of such a valve is therefore that, if a wave occurs when the diaphragm and the needle are decoupled (that is to say during relief of an overpressure), liquid can be entrained into the system, (since the float is blocked and cannot move in order to close off the aperture). Furthermore, in this very situation and/or in the event of a large overpressure, there is a risk of the central part of the diaphragm remaining stuck against the upper wall of the valve, and thus blocking the venting aperture.

SUMMARY OF THE INVENTION

The object of the present invention is to solve these problems by proposing a safety valve for the venting circuit of a liquid tank, comprising:

a) a chamber provided with a cover, which extends at least partly into the tank and is connected via an aperture to the venting circuit;

b) a float, which can slide vertically inside the chamber and close off the venting aperture in a high position; and c) a moveable wall, which divides the chamber into a lower portion in which the float slides and an upper portion which connects with the venting circuit, this wall being a moveable wall and having (generally at its centre) the venting aperture, said valve further including an aperture stop integral either with the moveable wall or with the cover of the chamber.

The safety valve is intended for the venting circuit of a tank that may contain any liquid. In particular, the liquid may be a fuel, a brake fluid or a lubricant. More particularly, the liquid is a fuel. The tank may be intended for any use, especially for equipping a vehicle and even more especially for equipping a motor vehicle.

The chamber of the valve may have any shape, often internally tailored to the sliding of the float. Usually for this purpose it has a constant internal cross section, at least in that portion where the float must be able to slide. In particular, it is internally cylindrical, at least in this portion.

The chamber of the valve is provided with a cover, which may either be moulded as one part with said chamber or it may form a separate part joined to the latter by any known means (mechanical fastening with a seal; welding etc.). This cover is advantageously connected to the venting circuit. This connection generally has the shape of a nozzle.

The valve float according to the invention generally has a head of appropriate size and shape for being able to close off the venting aperture. This head is advantageously provided with a seal, for ensuring that said closure is sealed off.

The external (lateral) shape of the float is obviously matched to that of the inside of the chamber in which it has to be able to slide. In particular, it is therefore externally cylindrical.

The valve according to the invention includes a moveable wall that divides it into a lower portion in which the float slides and an upper portion that connects with the venting circuit and is topped by the cover. By definition, this wall is therefore a partition wall and is moveable (by this it is meant that its central portion is moveable, but it is fastened via its edges (periphery) in the chamber—like any partition wall) and is pierced (generally at its centre) by the venting aperture. The term "moveable" is understood to mean that the centre of the wall can move both relative to the chamber and relative to the float.

This wall is in general substantially horizontal at rest and, apart from the venting aperture, is generally impermeable (i.e. there is no other aperture bringing the lower portion into communication with the upper portion of the valve). It may be moulded as one part with the chamber, but preferably it is a separate part that is fitted into the chamber by any appropriate means. The use of one or more inserts and corresponding support(s) gives good results. Preferably, the moveable wall rests in a circular groove (generally integral as one part with the chamber) where it is fitted by means of a fitting ring.

The mobility of the partition wall may be provided by any known means. Thus, it is possible to choose the shape and the constituent materials of this wall so as to obtain both mobility and sufficient sealing and mechanical strength. A non-uniform wall comprising a central portion and a peripheral portion of different nature and/or different geometry is very suitable. Good results are obtained when the central portion is thicker and based on a more rigid material than the peripheral part of the wall. In particular, the central portion may consist of an injection-moulded part made of a thermoplastic and the peripheral portion of a diaphragm made of an elastomer. These two parts are joined together in an appropriate manner, preferably by welding or co-injection moulding if their constituent materials are compatible, or by adhesive bonding.

The venting aperture may have any shape. It may be a simple hole (circular aperture with no peripheral relief) made approximately at the centre of the moveable wall. It may also be circular aperture whose edges have a geometry and a mechanical strength that promote sealing of the closure of said aperture by the head of the float. This embodiment is easy to implement if the central portion of the wall is an injection-moulded part.

The valve according to the invention includes a stop that is apertured. By this is meant a stop either made of several parts (for example studs) or as a single wall but pierced by apertures, so that venting can continue even in the event of a large overpressure, when the moveable wall is in the high position against said stop.

According to the invention, this stop may be integral with (fastened to or produced as one part with) either the cover or the moveable wall. It extends either downwards or upwards, respectively, in the upper portion of the chamber. Preferably, this stop is fixed and therefore integral with the cover. Most particularly preferably, it is moulded as one part with the cover.

According to a preferred embodiment of the present invention, a preloading spring is interposed between the moveable wall and the cover of the valve. The preloading of the spring defines the pressure levels at which the wall will move so as to separate from/mate with the float.

As mentioned above, the safety valve according to the invention may provide the ROV and/or FLVV function of a fuel tank.

The present invention applies particularly well to a valve that does provide both functions.

The valve according to the invention may be assisted in its ROV function by any device known for this purpose, such as a heavy ball, a spring, etc.

It may also be assisted in its FLVV function so as to permit a certain amount of overfilling, commonly called "round up", by a suitable geometry of its constituent elements.

Thus, for example, in a preferred embodiment of the invention, the chamber in which the float slides is a chamber closed at the bottom, that is to say provided with an impermeable base, but including at least one lateral opening via which venting takes place. When the liquid level reaches this window, a first tripping of the filling nozzle occurs following the inflow of liquid into the chamber. If the tank continues to be filled, the liquid will progressively fill the chamber and the float will start to rise until obstructing the venting aperture. At this moment, there is no longer any venting and the pressure will rise in the tank. Provided that measures are taken to ensure that the target pressure at which the wall rises (or $P_C$, which depends on the resistance of the wall and/or of the preloading spring, as the case may be) is above the usual trip pressure of fuel tank filling nozzles (or $P_D$), the filling nozzle is definitively tripped and the maximum level of the tank is reached.

In operation, if the float still closes off the venting aperture and the pressure in the tank reaches the abovementioned target pressure ($P_C$), the wall rises (by elastic deformation and/or deployment of at least one of its constituent parts) and the venting aperture is freed. Even in the case of a very high overpressure, the wall will be halted in its vertical movement by the stop and, since the latter is apertured, venting may continue. In the event of a wave at this particular moment, the float, which is still moveable, can close off the aperture and prevent liquid from penetrating into the venting circuit.

To avoid any liquid entrainment while the venting aperture is open (or the float is not in the high position) and to assist the 1st tripping of the filling nozzle, the valve according to this embodiment of the invention preferably includes a baffle, whether continuous or apertured, which lies inside the chamber parallel to the lateral wall of the latter and facing the opening. Preferably, it is a continuous baffle, substantially cylindrical in shape inside which the upper portion of the float slides. The outside diameter of the float in this region is therefore at least matched to the inside diameter of the baffle. This baffle may be supported by a part separate from the chamber and fitted into the latter. Preferably, it is moulded as one part with the chamber, for example, in the extension of the support for the moveable wall, where appropriate.

Finally, the valve according to this embodiment of the invention preferably includes a secondary closure member, giving the valve a two-stage effect. This is an closure member for effectively closing off the venting aperture of the valve and itself having an aperture that can be closed off by a needle present on the head of the float. The role of this closure member is to make it easier for the valve to reopen, that is to say to provide decoupling between the head of the float and the venting aperture. Preferably, the needle is integral with the head of the float. The float and the needle may be produced as a single part or may be produced separately and joined together. The term "needle" is understood to mean a tip of appropriate shape for closing off the aperture in the seal.

Most particularly preferably, the secondary closure member according to this embodiment of the invention consists essentially of a seal. By this it is meant in particular that the seal is "free", and not affixed to a support.

This seal may have any shape. A substantially flat seal (such as a membrane portion) gives good results and is simple to produce in practice. This flat seal may have any outline. A flat seal of substantially circular shape (i.e. a washer) is particularly simple and gives good results. This seal may be made of any material, but preferably one that is flexible enough to ensure sealing. Elastomers are particularly suitable as constituent materials for the seal, particularly fluoroelastomers.

According to this embodiment of the invention, the head of the float is provided with a device for limiting the movement of the seal. Preferably, this device forms an integral part of said head (and/or of its needle), that is to say the head/needle has (have) a geometry that allows the seal to move essentially vertically relative to it, but with a limited travel.

According to a first embodiment, the needle has, at its upper end (tip), a larger cross section than that of the aperture in the seal but also a cross section that is generally smaller than the cross section of the aperture in the seal.

According to a second, preferred embodiment, the head of the float comprises vertical hooked fingers that surround the needle and have an upper end higher than the needle. In this way, the seal can slide vertically between the hooked end of the fingers and a position where it bears on the head of the float. The term "hooked" is understood in fact to mean any shape allowing the seal to be retained. This shape may for example be that of an "L" on its tip.

In this embodiment, there are preferably at least three fingers so as to prevent the seal from leaking between two consecutive fingers. Most particularly preferably, there are at least four of them so as to limit this risk. These fingers are preferably placed symmetrically on the head of the float, and therefore in the form of a cross with equal branches when there are four of them. Most particularly preferably, these fingers guide the seal during its vertical travel, so as to minimize its lateral movements.

Advantageously, the shape of the head of the float, and in particular the portion on which the seal rests in certain positions of the valve, is convex (domed or conical) so as to prevent the seal from sticking on the head in the event of liquid being deposited at this point.

The constituent elements of the valve may be made of any material. Preferably, they are based on a thermoplastic. In this case, it is obviously convenient to choose the material or materials in such a way that they withstand the operating stresses. Of course, the materials chosen must be inert with respect to the liquids with which they have to be in contact, in particular inert with respect to fuels.

In particular in the case in which the liquid tank is a fuel tank made of plastic, most of the constituent elements of the valve according to the invention are also made of plastic. The term "plastic" is understood to mean any polymeric synthetic material, whether thermoplastic or thermosetting, which is in the solid state under ambient conditions, as well as blends of at least two of these materials. The intended polymers comprise both homopolymers and copolymers (especial binary or ternary copolymers). Examples of such copolymers are, non-limitingly: random copolymers, linear block copolymers, non-linear block copolymers, and graft copolymers. Thermoplastic polymers, including thermoplastic elastomers, and blends thereof are preferred.

Any type of thermoplastic polymer or copolymer, the melting point of which is below the decomposition temperature, is suitable. Thermoplastics having a melting range spread over at least 10 degrees Celsius are particularly suitable. Examples of such materials include those that exhibit polydispersion in their molecular weight.

In particular, the valve according to the invention may be made of polyolefins, grafted polyolefins, thermoplastic polyesters, polyketones, polyamides and copolymers thereof.

One polymer often used in plastic fuel tanks is polyethylene, in particular high-density polyethylene (HDPE) possibly in a multilayer structure including a barrier layer (for example based on EVOH, or hydrolysed ethylene/vinyl acetate copolymer) or one with a surface treatment (fluorination or sulphonation for example) for the purpose of making it impermeable to the fuels for which it is intended. Consequently, when the valve according to the invention includes a cover separate from the tank, this is preferably based on HDPE, so as also to be welded to the tank. As for the other parts of the valve, these are preferably based on at least one hydrocarbon-impermeable plastic. Examples of such hydrocarbon-impermeable plastics are, non-limitingly: polyethylene terephthalate or polybutylene terephthalate, polyamides, polyketones and polyacetals. It should be noted that all these parts, the cover included, may be multilayer structures, comprising, for example, at least one high-density polyethylene layer and optionally a hydrocarbon barrier layer (on the surface or within said structures).

In the case of a plastic fuel tank, and in particular one based on HDPE, good results have been obtained with valves, including a cover, based on HDPE, a chamber and a float made of POM (polyoxymethylene) or PBT (polybutylene terephthalate), and a hybrid moveable wall based on POM or PBT for the central portion and on a fluoroelastomer for the peripheral portion.

The method and location for fitting the valve to the tank may be chosen in any usual manner suitable for the specific conditions. Preferably, the valve is assembled directly on the upper wall of the tank, either by welding its cover (see above) to the wall of the tank, or by snap-fastening said cover into a relief of or on said wall.

BRIEF DESCRIPTION OF THE DRAWINGS

The invention will be illustrated in a non-limiting manner by FIGS. 1 and 2, which show a valve according to a preferred embodiment of the invention (or at least one portion thereof).

DETAILED DESCRIPTION OF THE INVENTION

Figure 1:
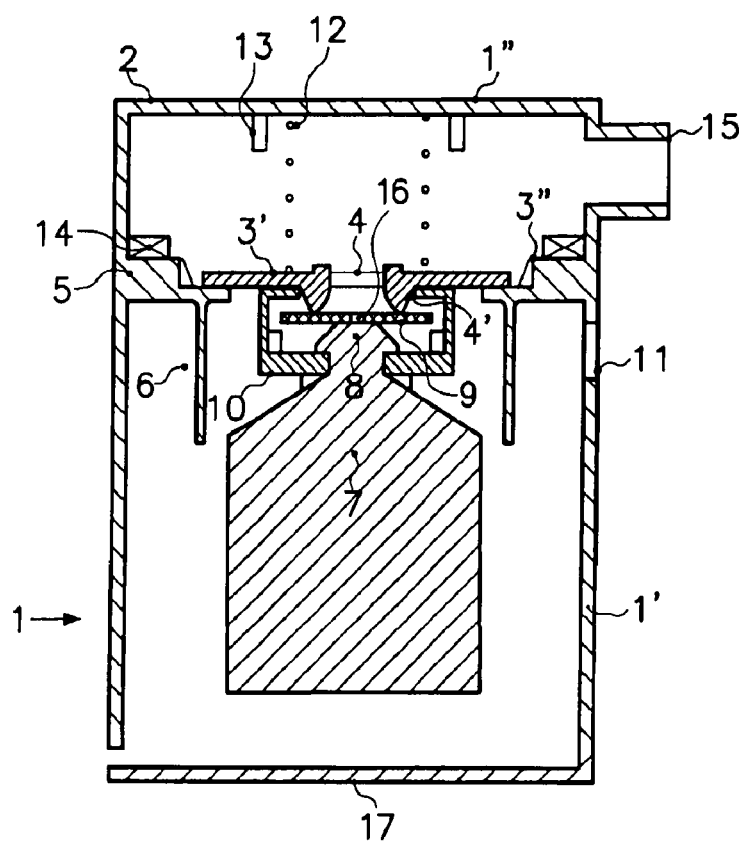
FIG. 1, shows the valve in a closed position.

The safety valve illustrated in these figures comprises a chamber (1) that extends inside the tank (not shown) and is provided with a cover (2) and with an impermeable base (17). This chamber (1) also includes a moveable wall (3) having a rigid central portion (3') provided with a venting aperture (4), and a flexible peripheral portion (3") consisting of a diaphragm. The edge of the aperture (4) is provided with a lip (4') having a geometry that promotes effective sealing. This wall (3) rests on a circular groove (5) moulded as one part with a cylindrical baffle (6) in which the head of a float (7) slides. This float (7) includes a needle (8) (produced as a single part with the float) on which a seal (9) having an aperture (16) rests and which is surrounded by fingers (10) that limit its vertical travel relative to the needle. The chamber (1) includes, in its lower portion (1'), a lateral opening (11) that allows the flow of gases. It also includes, in its upper portion (1"), a preloaded spring (12), the preload of which is adapted so that the wall (3) rises at a pressure above the usual trip pressure (PD) of fuel tank filling nozzles. This spring is therefore interposed between the cover (2) and the moveable wall (3). It is in fact housed via its upper portion in a stop (13) that forms an integral part of the cover (2) and that makes it possible to avoid, in the event of a high overpressure, the central portion (3') of the moveable part from sticking on the cover (2) and consequently prevents venting via the aperture (4). To allow this venting when the diaphragm is stuck thereto, this stop (13) consists in fact of separate studs.

This valve also includes a ring (14), which serves for fitting the diaphragm into the groove (5) where it rests, and also a nozzle (15), integral with the cover (2) and allowing the valve to be connected to the venting circuit of the tank.

Figure 2:
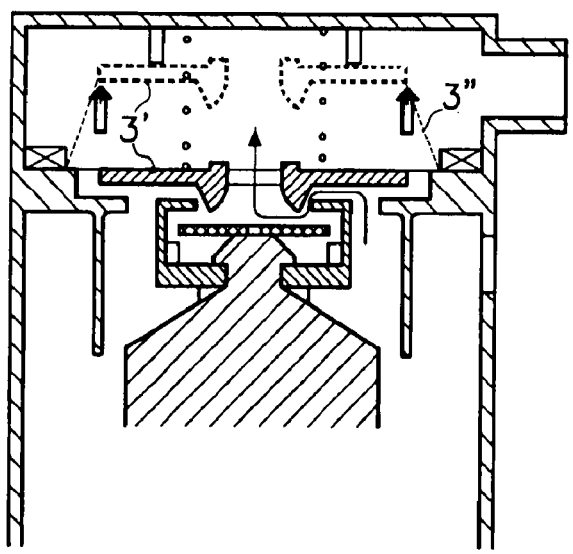
FIG. 2, shows the valve in an open position.

FIG. 1 shows said safety valve in a closed position, reached when the filling nozzle trips at the end of filling, and FIG. 2 illustrates this same valve, but as it reopens following a rise in pressure in the tank above the critical threshold ($P_C$), while it is still at its maximum fill level.

In this case, as illustrated by the thick vertical arrows, the wall is raised by tension in the diaphragm (3") and the gases under pressure can be discharged as indicated by the fine arrow, firstly by passing between the lips (4') of the aperture (4) and the fingers (10) of the float (7) and then via said aperture (4).

If a wave occurs in this position, the float will rise, supported by said wave, and will close off the aperture (4) via its seal (9) and its needle (8). When the wave has passed, the separation of the float (7) (initiated by its weight when it redescends) is facilitated by the fact that the aperture in the seal (9) is smaller than the venting aperture (4), and therefore the force exerted by a pressure difference on either side of this aperture is smaller.

The invention claimed is:

1. A safety valve for the venting circuit of a liquid tank, comprising:
   a chamber provided with a cover, which extends at least partly into the liquid tank and is connected via a venting aperture to the venting circuit;
   a float, which can slide vertically inside the chamber and close off the venting aperture in a high position;
   a wall which divides the chamber into a lower portion in which the float slides and an upper portion which connects with the venting circuit, the wall being a moveable wall and having the venting aperture, the moveable wall being configured to move upwards and away from the float so as to establish fluid communication between the lower portion and the upper portion through the venting aperture when a rising pressure in the liquid tank rises above a predetermined threshold, the moveable wall being non uniform and including a central portion and a peripheral portion, the central portion having a different structure and/or geometry than the peripheral portion, the central portion being an injection molded part made of a thermoplastic and the peripheral portion being a diaphragm made of an elastomer; and
   an aperture stop integral either with the moveable wall or with the cover and extending either upwards or downwards, respectively, in the upper portion of the chamber to position the central portion of the moveable wall away from the cover when the moveable wall is in a high position.

2. The valve according to claim 1, wherein the moveable wall rests in a circular groove where said moveable wall is fitted with a fitting ring.

3. The valve according to claim 1, wherein the aperture stop is moulded as one part with the cover.

4. The valve according to claim 1, wherein a preloaded spring is interposed between the moveable wall and the cover.

5. The valve according to claim 4, wherein said chamber is provided with an impermeable base, and includes at least one lateral opening, and wherein said preload spring is configured such that a target pressure at which the moveable wall rises is above a usual trip pressure of fuel tank filling nozzles.

6. The valve according to claim 5, wherein a baffle lies inside the chamber parallel to the lateral wall of the chamber and facing the lateral opening of the chamber.

7. The valve according to claim 1, further comprising a secondary closure member for closing off the aperture in the moveable wall, said secondary closure member including an aperture that can be closed off by a needle of the float.

8. A fuel tank equipped with a valve according to claim 1.

9. The valve according to claim 1, wherein the predetermined threshold is a critical pressure threshold while the liquid tank is at a maximum fill level.

10. The valve according to claim 1, wherein the moveable wall is moveable between a low position and the high position.

11. The valve according to claim 10, wherein, in the low position, the moveable wall abuts against an abutment extending outwardly from a vertical sidewall of the chamber.

12. The valve according to claim 10, wherein, in the low position, the float is configured to slide upward to close off the venting aperture of the moveable wall when a liquid level in the lower portion of the chamber reaches a predetermined level.

* * * * *